United States Patent [19]

Hara et al.

[11] Patent Number: 5,308,570
[45] Date of Patent: May 3, 1994

[54] PROCESS FOR PRODUCING MULTILAYER MOLDED ARTICLE

[75] Inventors: Takahisa Hara, Kawanishi; Masahito Matsumoto, Ibaraki; Nobuhiro Usui, Takatsuki; Shigeyoshi Matsubara, Osaka, all of Japan

[73] Assignee: Sumitomo Chemical Co., Ltd., Osaka, Japan

[21] Appl. No.: 811,302

[22] Filed: Dec. 20, 1991

[30] Foreign Application Priority Data

Dec. 21, 1990 [JP] Japan .................................. 2-404821

[51] Int. Cl.$^5$ ............................................. B29C 45/14
[52] U.S. Cl. .................................. 264/255; 264/257; 264/259; 264/273
[58] Field of Search ............... 264/250, 255, 257, 258, 264/261, 154, 155, 156, 241, 275, 277, 278, 279, 246, 247, 254, 259, 273; 425/90, 96, 97, 98, 290, 310, 553, 566, 571, DIG. 37

[56] References Cited

U.S. PATENT DOCUMENTS 4,783,298 11/1988 Oda ........................................ 264/155
4,933,131 6/1990 Okey et al. ........................... 264/255

FOREIGN PATENT DOCUMENTS 0333198 9/1989 European Pat. Off. .
0382238 8/1990 European Pat. Off. .
0439625 8/1991 European Pat. Off. .

Primary Examiner—Jay H. Woo
Assistant Examiner—Robert B. Davis
Attorney, Agent, or Firm—Birch, Stewart, Kolasch & Birch

[57] ABSTRACT

A multilayer molded article having good appearance is produced by providing a preheated fiber-reinforced resin sheet between a pair of upper and lower molds, and supplying a thermoplastic resin melt and optionally a foam sheet between the upper mold and the fiber-reinforced resin sheet. The thermoplastic resin melt is supplied through a resin supplying opening provided in the lower mold, and through a hole made in the fiber-reinforced resin sheet and the foam sheet. During the supply of the resin melt or as soon as the resin supply is finished, the molds are closed to further flow, and the resin melt is formed to produce a mu molded article made of the fiber-reinforced resin sheet, a skin layer of the thermoplastic resin and optionally the foam sheet therebetween.

12 Claims, 2 Drawing Sheets

PROCESS FOR PRODUCING MULTILAYER MOLDED ARTICLE

BACKGROUND OF THE INVENTION

1. Field of the Invention

The present invention relates to a multilayer molded article. More particularly, the present invention relates to a multilayer molded article comprising a fiber-reinforced resin sheet layer and a skin layer having good surface conditions.

2. Description of the Related Art

Since an article which is produced by press molding a fiber-reinforced resin sheet is excellent in strength, and in particular, a glass fiber-reinforced resin article, has larger reinforcing effects and is advantageous in view of production cost, it is used in applications where strength of the article is required, for example, in vehicle parts. But, an molded article of the fiber-reinforced resin sheet has poor appearance and no soft feeling. To improve such defects, a multilayer molded article having a laminated skin layer on the fiber-reinforced resin sheet is proposed. Hitherto, such multilayer molded article has been produced by bonding a core layer of the fiber-reinforced resin sheet and a premolded skin layer, or by injecting and foaming a foamable resin such as a polyurethane resin between a core layer of the fiber-reinforced resin sheet and a skin layer, to integrate them together.

However, the conventional methods for producing the multilayer molded article comprising the fiber-reinforced resin sheet and the skin layer have many steps and include high production costs.

SUMMARY OF THE INVENTION

An object of the present invention is to provide a process for producing a multilayer molded article comprising a fiber-reinforced resin sheet and a skin layer which has good appearance and feeling.

According to a first aspect of the present invention, there is provided a process for producing a multilayer molded article comprising the steps of:

providing a preheated, fiber-reinforced resin sheet between a pair of upper and lower molds, supplying a resin melt of a thermoplastic resin between said upper mold and said fiber-reinforced sheet from a resin supplying opening provided in said lower mold through a hole made in said fiber-reinforced sheet, during the supply of said resin melt or as soon as the resin supply is finished, closing the molds to flow and form said resin melt to produce a multilayer molded article comprising said fiber-reinforced resin sheet and a skin layer of said thermoplastic resin which is integrally laminated on said resin sheet.

According to a second aspect of the present invention, there is provided a process for producing a multilayer molded article comprising steps of:

providing a preheated fiber-reinforced resin sheet between a pair of upper and lower molds and then a foam sheet on said resin sheet, supplying a resin melt of a thermoplastic resin between said upper mold and said foam sheet from a resin supplying opening provided in said lower mold through holes made in said fiber-reinforced sheet and said foam sheet, during the supply of said resin melt or as soon as the resin supply is finished, closing the molds to flow and form said resin melt to produce a multilayer molded article comprising said fiber-reinforced resin sheet, said foam sheet and a skin layer of said thermoplastic resin which is integrally laminated on said foam sheet.

DETAILED DESCRIPTION OF THE INVENTION

Figure 1A:
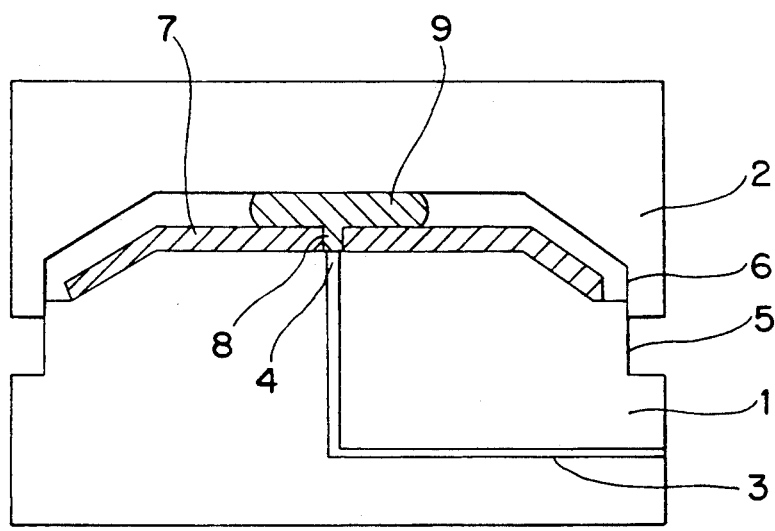
FIGS. 1A and 1B are vertical cross sections of an molding apparatus used for carrying out one embodiment of the process of the present invention.

As the fiber-reinforced resin sheet, are used a thermoplastic resin (e.g. polypropylene, polyamide, etc.) which is reinforced with inorganic fibers (e.g. glass fiber, carbon fiber, stainless steel fiber, etc.), organic fibers (e.g. polyamide fiber, polyester fiber, aramid fiber, etc.) or a mixture of the inorganic fiber and the organic fiber. As the reinforcing fibers, conventional fibers, each having a diameter of 1 to 50 $\mu$m, are used. Among them, the glass fiber is preferred since it has large reinforcing effects at a low cost.

Among the fiber-reinforced sheet are preferred a sheet prepared by impregnating a mat-form article or an unwoven fabric of long glass fibers with a molten thermoplastic resin such as polypropylene or polyamide, a sheet prepared by mixing middle length glass fibers having a length of several mm to 50 mm and a powdery thermoplastic resin such as polypropylene, heating and melting the mixture and molding it. Also preferred is sheet prepared by mixing the middle length glass fibers and a powdery thermoplastic resin, such as polypropylene, and hardening it together with an adhesive to form a mat-form article, in view of the production cost.

The thermoplastic resin used in the present invention is supplied in a molten state on the surface of the fiber-reinforced resin sheet, or the foam sheet and flow formed to provide the skin layer. Examples of the thermoplastic resin include thermoplastic elastomers, such as olefinic thermoplastic elastomers and styrene based thermoplastic elastomers, soft vinyl chloride resins, low density polyethylene ethylene, and the like. Among them, the olefinic thermoplastic elastomers are preferred, since they are excellent in transferability of emboss, soft feeling, and heat resistance.

The thermoplastic resin should be selected by taking into consideration its properties for fusion bonding with the fiber-reinforced resin sheet or the foam sheet. When a fiber-reinforced resin sheet comprising polypropylene as a matrix resin is used, the olefinic thermoplastic elastomer is preferred as the thermoplastic resin since it has good fusion bonding properties and good transferability of embosses from the mold. However, when a fiber-reinforced resin sheet comprising polyamide as a matrix resin is used, the olefinic thermoplastic elastomer has insufficient fusion bonding properties with polyamide and is less preferred.

In the present invention, it is possible to produce a multilayer molded article having a foam layer by providing the fiber-reinforced resin sheet in the molds, placing the foam sheet on the resin sheet, and then supplying the molten thermoplastic resin. In this case, the foam sheet should be strongly bonded to both the fiber-reinforced resin sheet and the thermoplastic resin of the skin layer.

A strongly fusion bonded integral multilayer article can be produced by providing a fiber-reinforced resin sheet comprising polypropylene as a matrix resin, placing a foam sheet of polypropylene, supplying the olefinic thermoplastic resin as the resin melt and molding them together, since this combination of the materials has good fusion bonding properties with each other.

When a multilayer molded article is produced by providing a fiber-reinforced resin sheet comprising polypropylene as a matrix resin, placing a polyurethane foam sheet, supplying the olefinic thermoplastic elastomer as the resin melt and molding them together, three layers are strongly integrated by the so-called anchor effect of the resins, since molten polypropylene or the olefinic thermoplastic elastomer penetrates into unevenness on the surface of the foam sheet.

In case of a combination of the layers which have poor adhesion to each other, when a pair of intermediate layers such as fabric are adhered with an adhesive, or fusion bonded to the both surfaces of the foam sheet, the matrix resin and the thermoplastic resin of the skin layer penetrate into the fabric, so that the foam sheet is strongly integrated with the fiber-reinforced sheet and the skin layer through the fabric.

When the foam sheet is provided in the multilayer molded article according to the present invention, preferred examples of the foam sheet are foam sheets of polypropylene and polyurethane. The expansion ratio of the foam is preferably from 5 to 45 times.

The process of the present invention will be explained further in detail by making reference to the accompanying drawings.

Figure 1B:
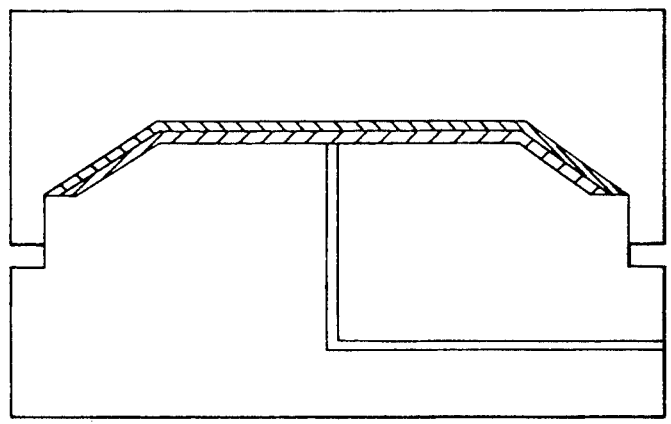

Referring to FIG. 1, on a lower mold 1 having a resin melt conduit 3 therein, a glass fiber-reinforced resin sheet 7, which is preheated outside the molds, is placed. The fiber-reinforced resin sheet 7 has a hole 8 larger than a diameter of a resin supplying opening 4 at a position corresponding to the position of the resin supplying opening 4. An upper mold 2 which may have embosses on its inner wall is lowered. Before complete closing of the molds, the upper mold 2 is once stopped or its lowering rate is decreased, and a resin melt 9 is supplied from the resin supplying opening 4. The supplied resin melt 9 passes through the hole 8 and reaches a cavity space between the fiber-reinforced resin sheet 7 and the upper mold 2. Before or at the same time as the finishing of the resin supply, the lowering of the upper mold 2 is restarted or accelerated to close the molds till a cavity clearance reaches a predetermined value, whereby the resin melt 9 flows to the cavity edges to form a skin layer which may have clear embosses which are transferred from the inner wall of the upper mold. A part of the matrix resin of the fiber-reinforced sheet 7 melts and flows to fill the cavity edges, whereby the core layer is formed.

Figure 2A:
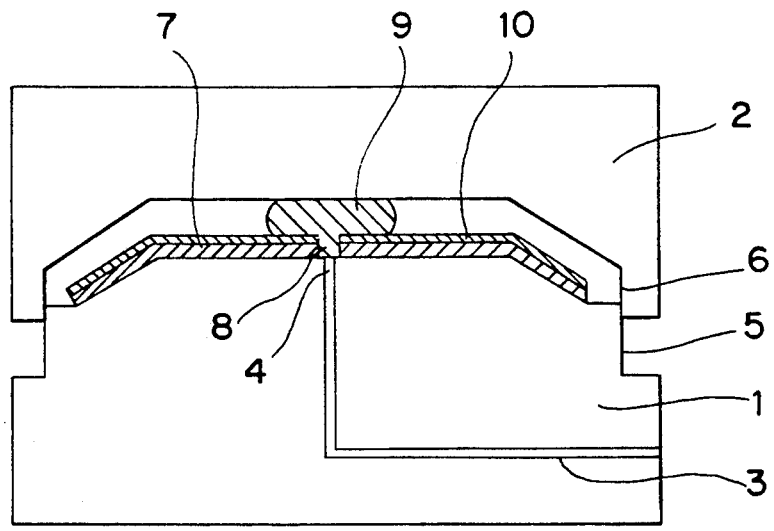
FIGS. 2A and 2B are vertical cross sections of an molding apparatus used for carrying out another embodiment of the process of the present invention.
Figure 2B:
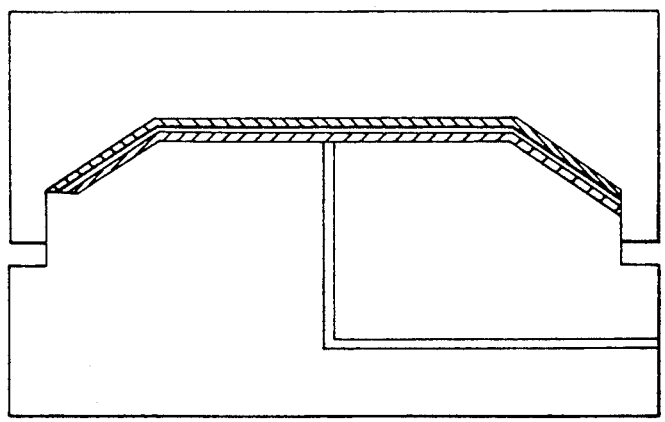

When the foam sheet 10 is used as an intermediate layer, as shown in FIG. 2, a fiber-reinforced resin sheet 7 having a hole which is larger than a diameter of the resin supplying opening 4 and formed at a position corresponding the opening 4 is placed on the lower mold 1, then the foam sheet having a similar hole 8, which is larger than the diameter of the resin supplying opening 4 and formed at a position corresponding to the opening 4, is placed on the fiber-reinforced resin sheet and the resin melt 9 is supplied from the outlet 4 through the holes 8 into the space between the upper mold 2 and the foam sheet 10 to mold a multilayer article having the foam layer.

Preferably, the resin melt is supplied by adjusting a lowering rate of the upper mold 2 to 0 to 30 mm/sec. when the clearance between the upper and lower molds is from $(c+5)$ to $(c+100)$ mm, wherein c is a thickness of the final product. Then, before or as soon as the resin supply is finished, the lowering of the upper mold 2 is restarted or accelerated to mold the multilayer article having an excellent appearance. If the lowering rate is not smaller than 30 mm/sec. or the resin supply is not carried out when the clearance of the molds is outside the above range, the molded article may have unevenness or flow marks on the skin layer, or often, the transfer of the emboss is difficult. When the foam sheet 10 is used as the intermediate layer, since the foam sheet 10 has weak resistance to heat and pressure and tends to be crushed or deformed during molding, the lowering rate of the upper mold 2 and the timing of the resin supply in accordance with the cavity clearance are important.

Since, according to the present invention, the resin melt 9 is supplied in the mold cavity before the mold closing is completed, or the resin melt 9 is supplied while the molds are being closed to flow the resin melt so as to fill the mold cavity, the article can be molded under pressure lower than that in the injection molding. Thereby, the foamed sheet is not damaged and a molded article having excellent appearance can be produced.

PREFERRED EMBODIMENTS OF THE INVENTION

The present invention will be illustrated by the following Examples, which do not limit the scope of the present invention.

EXAMPLE 1

Figure 3:
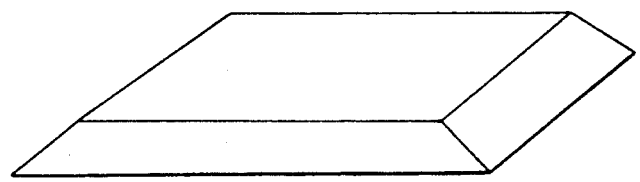
FIG. 3 is a perspective view of an article produced in Examples.

A pair of molds, which produce an article of FIG. 3, were attached to upper and lower platens, the upper one of which was vertically moved, and which had a clamping force of 100 tons, and the article was molded under the following conditions.

As a fiber-reinforced resin sheet, a polypropylene sheet having a thickness of 2 mm reinforced with 30% by weight of middle-length glass fibers having a length of 10 to 50 mm (manufactured by Keipla Sheet Co , Ltd.) was used. A hole was formed in this sheet at a position corresponding to the position of the resin supply outlet 4 of the lower mold 1, and the sheet was preheated and softened at 230° C. in an oven. Then, the sheet was placed on the lower mold, fitting the hole 8 to the resin supplying opening 4 as shown in FIG. 1A.

The upper mold 2 having emboss ornaments on its inner wall was lowered at a rate of 200 mm/sec. When the cavity clearance reached 10 mm, the lowering of the upper mold was stopped, and an olefinic thermoplastic elastomer (Sumitomo TPE 3465 Black manufactured by Sumitomo Chemical Co., Ltd.), which had been heated until molten at 220° C., was supplied between the upper mold 2 and the glass fiber-reinforced polypropylene sheet 7 from the resin supplying opening 4 through the hole 8. At this time, the temperatures of the upper and lower molds were 80° C. and 60° C., respectively. Just before the completion of the resin melt supply, the lowering of the upper mold 2 was restarted at a rate of 25 mm/sec., and stopped when the clearance reached 3 mm, followed by cooling under pressure for 90 seconds to finish molding.

The produced molded article was a two layer molded article consisting of a core layer of the glass fiber-reinforced polypropylene and the skin layer of the olefinic thermoplastic elastomer which was integrally laminated on the polypropylene layer and had beautifully transferred embosses and soft feeling.

EXAMPLE 2

The same glass fiber-reinforced polypropylene sheet having the hole 8 as used in Example 1 was preheated and softened at 230° C. in the oven and then placed on the lower mold 1, fitting the hole to the resin supplying opening 4. Thereafter, a polypropylene foam sheet (an expansion ratio of 15, a thickness of 3.0 mm) (PPSM 15030 manufactured by Toray) which had a hole at the same position as the glass fiber-reinforced polypropylene sheet was placed on the glass fiber-reinforced polypropylene sheet 7.

The upper mold 4 was lowered at a rate of 200 mm/sec. When the cavity clearance reached to 30 mm, the lowering rate of the upper mold was decreased to 8 mm/sec., and an olefinic thermoplastic elastomer (Sumitomo TPE 3465 Black manufactured by Sumitomo Chemical Co., Ltd.) which had been heated until molten at 230° C. was supplied between the upper mold 2 and the foam sheet 10 from the resin supply outlet 4 through the holes 8. At this time, temperatures of the upper and lower molds were 80° C. and 60° C., respectively. As soon as the cavity clearance reached 18 mm and the resin melt supply was completed, the lowering of the upper mold 2 was accelerated to 20 mm/sec. and stopped when the clearance reached 4.5 mm, followed by cooling under pressure for 120 seconds to finish molding.

The produced molded article was a three layer molded article consisting of a core layer of the glass fiber-reinforced polypropylene and the skin layer of the olefinic thermoplastic elastomer which was integrally laminated on the glass fiber-reinforced polypropylene layer through the polypropylene foam sheet and had beautifully transferred embosses and soft feeling, but no flow mark.

EXAMPLE 3

In the same manner as in Example 2 except that a polyurethane foam sheet having an expansion ratio of 17 and a thickness of 4.0 mm (manufactured by Inoac Co., Ltd.) was used in place of the polypropylene foam sheet, a three layer molded article having good appearance was produced.

EXAMPLE 4

In the same manner as in Example 1 except that a polypropylene sheet having a thickness of 3.0 mm which is reinforced with long glass fibers (X Sheet manufactured by Idemitsu NSG Co., Ltd.) was used, and the lowering of the upper mold was stopped when the clearance reached 4.0 mm, a two layer molded article was produced.

The produced molded article was a two layer molded article consisting of a core layer of the glass fiber-reinforced polypropylene and the skin layer of the olefinic thermoplastic elastomer which was integrally laminated on the polypropylene layer and had beautifully transferred embosses and soft feeling.

COMPARATIVE EXAMPLE

In the same manner as in Example 1 except that, after 20 seconds from the completion of the resin supply, the lowering of the upper mold was accelerated to 20 mm/sec. to close the molds, a two layer molded article was produced. The embossed surface of the olefinic thermoplastic resin skin layer had unevenness and emboss flows, and the article had bad appearance.

What is claimed is:

1. A process for producing a multilayer molded article comprising the steps of:
   providing a preheated fiber-reinforced resin sheet between a pair of upper and lower molds,
   supplying a resin melt of a thermoplastic resin between said upper mold and said fiber-reinforced resin sheet from a resin supplying opening provided in said lower mold through a hole made in said fiber-reinforced resin sheet, and
   closing of the molds by moving the upper mold toward the lower mold during resin supply or as soon as the resin supply is finished to produce a multilayer molded article comprising said fiber-reinforced resin sheet and a skin layer of said thermoplastic resin which is integrally laminated on said resin sheet.

2. The process according to claim 1, wherein said thermoplastic resin is an olefinic thermoplastic elastomer.

3. A process for producing a multilayer molded article comprising the steps of:
   providing a preheated fiber-reinforced resin sheet between a pair of upper and lower molds and then a foam sheet on said resin sheet
   supplying a resin melt of a thermoplastic resin between said upper mold and said foam sheet from a resin supplying opening provided in said lower mold through holes made in said fiber-reinforced resin sheet and said foam sheet, and
   closing of the molds by moving the upper mold toward the lower mold during resin supply or as soon as the resin supply is finished to produce a multilayer molded article comprising said fiber-reinforced resin sheet, said foam sheet and a skin layer of said thermoplastic resin which is integrally laminated on said foam sheet.

4. The process according to claim 3, wherein said thermoplastic resin is an olefinic thermoplastic elastomer.

5. The process according to claim 1, wherein said fiber-reinforced resin sheet comprises reinforcing fibers embedded in a thermoplastic resin.

6. The process according to claim 5, wherein said thermoplastic resin of said fiber-reinforced resin sheet is selected from the group consisting of polypropylene and polyamide.

7. The process according to claim 1, wherein the reinforcing fibers of said fiber-reinforced resin sheet are selected from the group consisting of glass fiber, carbon fiber, stainless steel fiber, polyamide fiber, polyester fiber, aramid fiber, and mixtures thereof.

8. The process according to claim 7, wherein said fiber is a glass fiber.

9. The process according to claim 3, wherein said fiber-reinforced resin sheet comprises reinforcing fibers embedded in a thermoplastic resin.

10. The process according to claim 9, wherein said thermoplastic resin of said fiber-reinforced resin sheet is selected from the group consisting of polypropylene and polyamide.

11. The process according to claim 3, wherein the reinforcing fibers of said fiber-reinforced resin sheet are selected from the group consisting of glass fiber, carbon fiber, stainless steel fiber, polyamide fiber, polyester fiber, aramid fiber, and mixtures thereof.

12. The process according to claim 11, wherein said fiber is a glass fiber.

* * * * *